Nov. 7, 1944.         M. H. EWING         2,362,061
TIRE AND WHEEL SEPARATING APPARATUS
Filed March 2, 1942         2 Sheets-Sheet 2

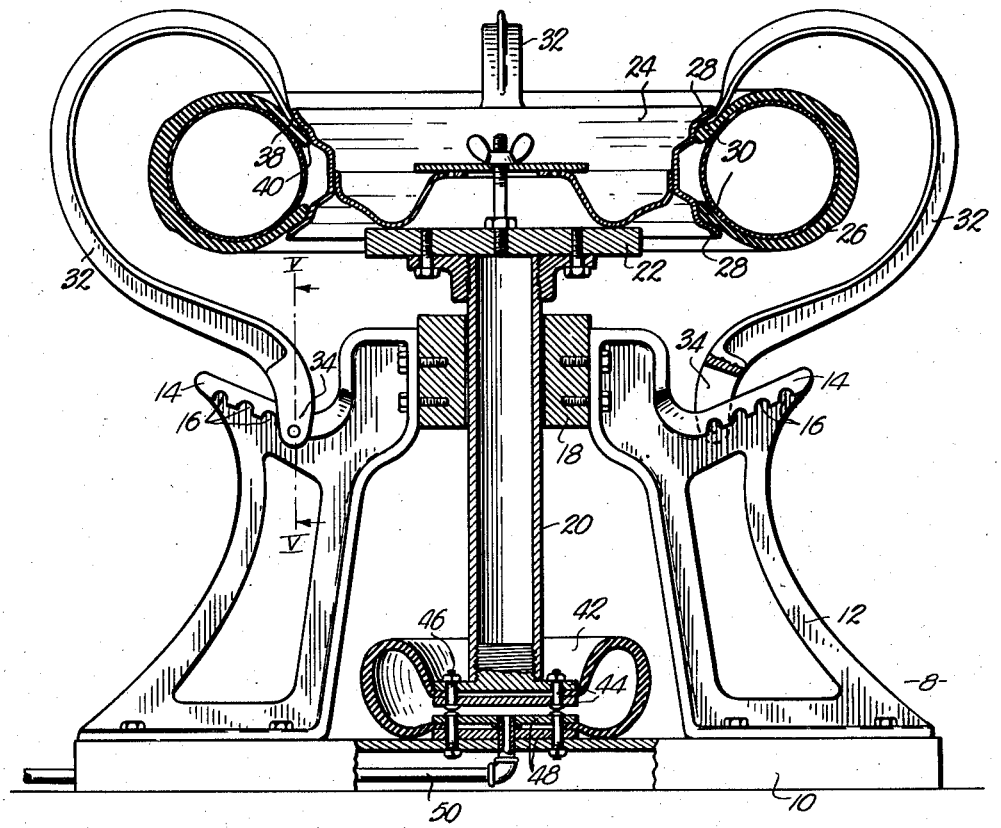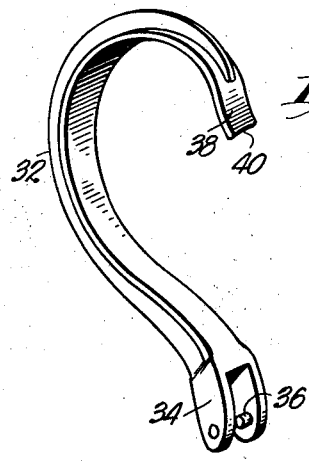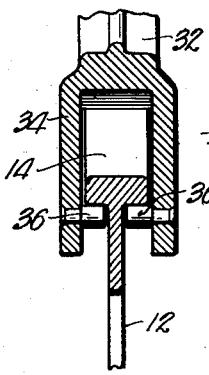

INVENTOR.
Melvin H. Ewing
BY
ATTORNEY.

Patented Nov. 7, 1944

2,362,061

UNITED STATES PATENT OFFICE 2,362,061

TIRE AND WHEEL SEPARATING APPARATUS

Melvin H. Ewing, Sabetha, Kans.

Application March 2, 1942, Serial No. 432,953

1 Claim. (Cl. 157—6)

This invention relates to tire and wheel separating apparatus and has for its primary object, the provision of means for quickly, easily and effectively separating a tire from its supporting wheel whereby the use of hand tools or instruments requiring manual manipulation is reduced to a minimum.

One of the important aims of this invention is to provide an apparatus of the aforementioned character having as a part thereof, specially formed supporting elements for the tire and wheel to be separated; unique tire engaging members adjustably carried by the base of the apparatus in a manner permitting the accommodation of tires having various widths and diameters; and means actuated by fluid under pressure for imparting force to one of the elements being separated, whereby dislodgement thereof may occur without injury thereto.

Another important aim of this invention is the provision of tire and wheel separating apparatus having as a component part thereof, a series of tire engaging hooks, each mounted upon a specially formed base for radial outward and upward movement, to the end that tires and wheels of different sizes may be quickly accommodated and the elements thereof separated through the employment of fluid actuated members mounted on the said base.

A yet further aim of this invention is the provision of apparatus for handling automobile wheels and tires, and especially the operation thereof, which apparatus includes an unique fluid actuated ram, the movement whereof is controlled by an expansible bellows formed to yieldably maintain the ram in a normal position, yet to allow lateral offsetting thereof in the event a greater amount of force is required at one point on the automobile tire when removal thereof is occurring.

A large number of minor objects of the present invention will appear during the course of the following specification and will therein be indicated that such minor objects include ruggedness of construction, simplicity and ease of operation, quick and convenient adjustment to accommodate tires of different sizes, and the employment of means permitting a yielding action, if such action is necessary to avoid undue strain that would result in the racking of the apparatus as a whole.

In the drawings:

Fig. 1 is a vertical central sectional view through a tire wheel and separating apparatus, made in accordance with the present invention.

Fig. 4 is a perspective view of one of the tire engaging hooks, showing the same entirely removed from association with the remaining parts of the apparatus; and Fig. 5 is an enlarged detailed fragmentary view taken on line V—V of Fig. 1.

Figure 2:
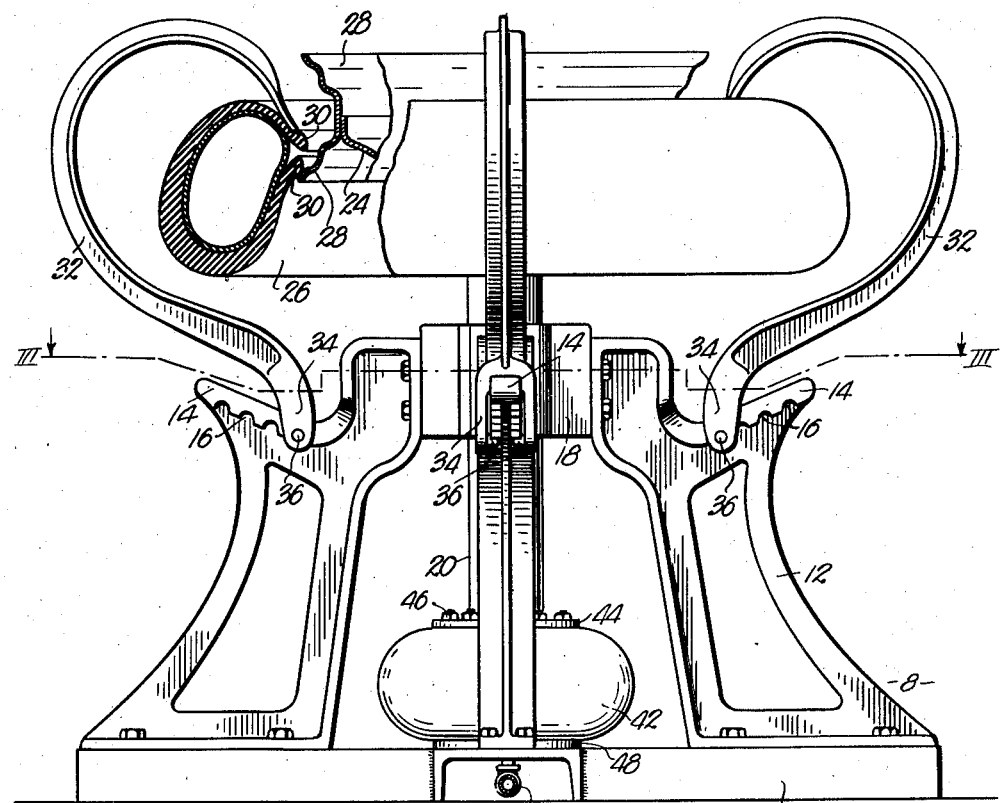
Fig. 2 is a side elevational view thereof but with the parts in a position where tire and wheel are practically separated.
Figure 3:
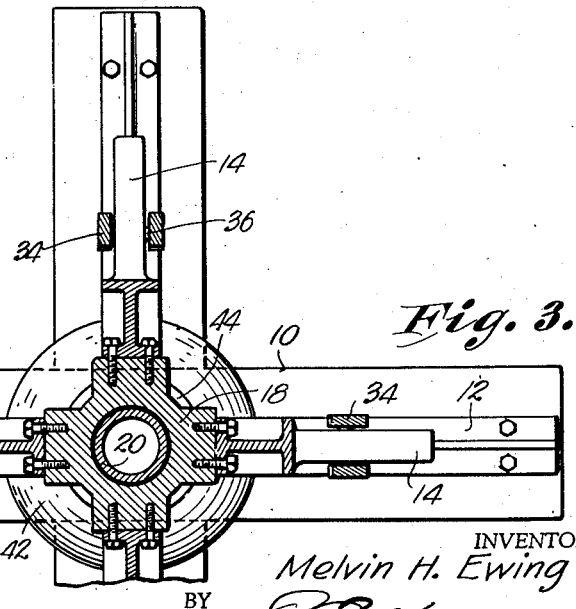
Fig. 3 is a horizontal sectional view taken on line III—III of Fig. 2.

Tire removing apparatus that has heretofore been employed by the trade is objectionable to a greater or lesser extent because of the necessity of using interchangeable parts to accommodate tires of different sizes, also because the force exerted to remove the tire from the wheel is a positive one and the elements embodying said force often times injure the tire because of their non-yielding character. Speed with which a tire may be removed from a wheel is also a vital element in the practicability of apparatus of the character contemplated by this invention, and therefore, simplicity of structure must be considered and has been presented when producing apparatus made in accordance with my preferred embodiment thereof.

In the drawings, the numeral 8 broadly designates a base, which base includes a bed plate 10 and a number of upstanding brackets 12. Each of said brackets 12 has a radial head 14 thereon, provided with a plurality of notches 16 arranged in an upwardly and outwardly diverging path. Specifically, head 14 is T-shaped in cross section and said notches 16 are formed in the underside of each overhanging face along the lower edge of said T-shaped head.

Brackets 12 are joined at their uppermost ends by a bearing 18 through which passes standard 20. The opening in bearing 18 is somewhat greater in diameter than the outside diameter of standard 20 to permit lateral movement or slight angularity under certain conditions to be more fully hereinafter set down.

Standard 20 has a table 22 on its uppermost end to receive the conventional automobile wheel 24, upon which is mounted a tire 26. Wheel 24 has annular flanges 28 beneath which fit the beads 30 of tire 26. It is the connection between these members, i. e., flanges 28 and beads 30 that must be forcibly broken in many instances, when the wheel and tire are to be separated. Long use of an automobile wheel without removing the tire therefrom, often establishes a rigid bond between these parts that cannot be broken without the application of a tremendous amount of force. In breaking this connection, some separators resort to the use of sledges but injury to the tire and rim frequently occurs and therefore, equipment made as described and shown in the accompanying drawings, is desirable and advantageous.

A number of hooks 32 supported by base 8 are arranged in a circumscribing path around standard 20. These hooks 32 are formed as shown in Figs. 1, 2 and 4 to present bodies capable of clearing tires of different diameters and widths, especially when adjustment at the zone of connection between base and hook 8 and 32 is permitted through the employment of notched head 14 and the bifurcated end 34 of hook 32. This bifurcated end of hook 32 has a pair of inwardly directed pins 36 to enter notches 16. When these pins 36 fall from notches 16, the particular hook 32 cannot drop from base 8 but will have the bight of the substantially U-shaped bifurcated end 34 in engagement with the upper smooth surface of the T-shaped head 14.

The opposite ends of each hook 32 is flat as at 38 and arched outwardly and downwardly to insure entrance between flange 28 and bead 30. The extreme free end of each hook 32 is arcuate as at 40. This arcuate edge of hook 32 is substantially concentric with the axis of standard 20. Adjustability of hooks 32 on base 8 is easily accomplished, no wrenches or special tools are needed, and these hooks will maintain themselves in place once they are moved by the operator.

Standard 20 is attached to bellows 42 at its lower end, through the medium of plates 44, one of which lies on each side of the marginal edge of bellows 42. This bellows 42 is in the nature of a small annulus having a slot around the innermost surface thereof and in nature, is similar to a small automobile casing.

Bolts or similar fastening means 46 secure plates 44 together and in clamping relation with the marginal edge of this bellows 42. Plates 48 likewise engage the marginal edge of bellows 42, as shown in Fig. 1, and these plates receive one end of a fluid supply pipe 50, which extends to a source of compressed air or other fluid. A valve not here shown, is interposed in this supply pipe so that the operator may control the flow of fluid to and from bellows 42.

This bellows 42 is so constructed and anchored to bed plate 10 as to allow standard 20 to move laterally a slight amount in case one of the hooks 32 should not enter between flange 28 and bead 30 with the same degree of speed as the remaining hooks. Therefore, a slight tipping of the entire wheel and tire assembly will occur when standard 20 is disposed at a slight angle. When such is done, the operator may readjust hooks 32 or by a slight tap on the hook being retarded, will permit the same to assume a position which is substantially the same as the remaining members. When this is done, standard 20 will be moved back to its normal vertical position and the wheel 24 will remain in a horizontal plane as the tire is drawn therefrom in a manner shown in Fig. 2.

The employment of a relatively non-rigid bellow or means for applying force to standard 20 is a decided advantage and when combined with hooks and base 32 and 8 respectively, in the manner just set down, will insure a positive action free from destructive effects.

From the foregoing it will be obvious to one skilled in the art that tires and wheels of all standard sizes and makes may be accommodated by the apparatus, and the simplicity of action coupled with the tremendous force capable of being exerted, results in efficient operation. Obviously, apparatus having different physical characteristics than those shown and described, might be made without departing from the spirit of the invention or scope of the appended claim.

Having thus described the invention, what is claimed as new and desired to be secured by Letters Patent is:

In apparatus of the character described having a base, upstanding brackets on said base and a plurality of tire-engaging hooks swingably anchored to the base, a bearing having a circular opening; means for supporting said bearing in spaced relation above the base; a vertical standard of circular cross section journalled for longitudinal movement in the bearing relatively to said base; a table on the upper end of the standard for supporting a tire, the diameter of said bearing opening being greater than the diameter of the standard to permit limited lateral movement of the standard under uneven pressure of said hooks on the tire; a bellows at the lower end of the standard between said brackets and adapted, while being inflated, to lift the standard, and means for supplying fluid under pressure through the base to said bellows to inflate the same, said bellows comprising a hollow annulus having a continuous slot formed along that periphery of its wall having the smallest radius, a plate secured to each of the marginal edges of the annulus created by said slot, one of said plates being anchored to the base, the other of said plates being secured to the lower end of the standard.

MELVIN H. EWING.